(12) United States Patent
Brown et al.

(10) Patent No.: US 8,725,857 B2
(45) Date of Patent: May 13, 2014

(54) DYNAMIC QUERY SERVICES AND METHODS

(75) Inventors: Bradley D. Brown, Littleton, CO (US); Gregg Christopher Petri, Arvada, CO (US); Matthew G. Mendrala, Parker, CO (US)

(73) Assignee: Rolta International, Inc., Alpharetta, GA (US)

( * ) Notice: Subject to any disclaimer, the term of this patent is extended or adjusted under 35 U.S.C. 154(b) by 31 days.

(21) Appl. No.: 12/913,301

(22) Filed: Oct. 27, 2010

(65) Prior Publication Data

US 2012/0110652 A1    May 3, 2012

(51) Int. Cl.
*G06F 15/173*    (2006.01)

(52) U.S. Cl.
USPC .......................................................... 709/223

(58) Field of Classification Search
USPC .......... 709/203, 217, 223, 224; 707/1, 2, 3, 5, 707/10, 104, 792, 802, 803, 805, 769
See application file for complete search history.

(56) References Cited

U.S. PATENT DOCUMENTS

| | | | | |
|---|---|---|---|---|
| 6,418,448 B1 * | 7/2002 | Sarkar | | 1/1 |
| 6,928,431 B2 * | 8/2005 | Dettinger et al. | | 1/1 |
| 6,954,748 B2 * | 10/2005 | Dettinger et al. | | 707/774 |
| 7,024,425 B2 * | 4/2006 | Krishnaprasad et al. | | 1/1 |
| 7,080,088 B1 * | 7/2006 | Lau | | 1/1 |
| 7,475,066 B2 * | 1/2009 | Dettinger et al. | | 1/1 |
| 7,552,151 B2 * | 6/2009 | Betz et al. | | 1/1 |
| 7,680,781 B1 * | 3/2010 | Wasserman et al. | | 707/999.004 |
| 7,756,922 B2 * | 7/2010 | Basu et al. | | 709/203 |
| 7,809,768 B2 * | 10/2010 | Owens et al. | | 707/803 |
| 7,853,573 B2 * | 12/2010 | Warner et al. | | 707/693 |
| 7,899,834 B2 * | 3/2011 | Oezgen | | 707/758 |
| 7,962,470 B2 * | 6/2011 | Degenkolb et al. | | 707/709 |
| 7,987,163 B2 * | 7/2011 | Keshavarz-Nia et al. | | 707/694 |
| 8,271,472 B2 * | 9/2012 | de Morentin Martinez et al. | | 707/707 |
| 8,285,736 B2 * | 10/2012 | Dettinger et al. | | 707/759 |
| 8,321,451 B2 * | 11/2012 | Dettinger et al. | | 707/769 |
| 2005/0050141 A1 * | 3/2005 | An et al. | | 709/203 |
| 2005/0198206 A1 * | 9/2005 | Miller et al. | | 709/219 |
| 2006/0026552 A1 * | 2/2006 | Mazzitelli et al. | | 717/101 |
| 2007/0282879 A1 * | 12/2007 | Degenkolb et al. | | 707/101 |
| 2008/0071916 A1 * | 3/2008 | Lee et al. | | 709/229 |
| 2008/0263006 A1 * | 10/2008 | Wolber et al. | | 707/3 |
| 2009/0234860 A1 * | 9/2009 | Brown | | 707/10 |
| 2011/0231435 A1 * | 9/2011 | Bush et al. | | 707/769 |
| 2012/0110652 A1 * | 5/2012 | Brown et al. | | 726/7 |

* cited by examiner

*Primary Examiner* — Lashonda Jacobs
(74) *Attorney, Agent, or Firm* — Ann I. Dennen; Lanier Ford Shaver & Payne P.C.

(57) ABSTRACT

A system has a network and a data source communicatively coupled to the network. Further, the system has logic configured to discover the data source available on the network and store metadata indicative of the discovered data source in memory, the logic further configured to generate a release parcel, in response to a user input, for performing operations on the data source, the logic further configured to deploy the release parcel to a dynamic query service computing device wherein operations on the data source can be performed through the release parcel.

18 Claims, 10 Drawing Sheets

DYNAMIC QUERY SERVICES AND METHODS

Nonprovisional Patent Application Under 35 U.S.C. §111(a) and 37 C.F.R. §1.53(b) In the United States Patent and Trademark Office

BACKGROUND

The disclosure relates generally to communication with data sources. More particularly, the disclosure relates to techniques for providing access to a variety of data sources by utilizing a tool that deploys a release of dynamic query services (DQS) to a computing device based upon a DQS selected by a user.

Oftentimes a company will have a variety of different data sources connected to a network. Typically, each of the data sources can be accessed through the network. However, access to each of the data sources may be constrained to a particular protocol. Thus, a user of the data source will oftentimes have to be versed in the each of the protocols of each of the data sources in order to access each of the data sources.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the invention. Furthermore, like reference numerals designate corresponding parts throughout the figures.

DETAILED DESCRIPTION

The present disclosure relates to dynamic query service (DQS) systems and methods for accessing a plurality of data sources over a network. In this regard, a DQS system of the present disclosure provides a mechanism whereby regardless of the type of data sources and the different protocols that may be necessary to access such data sources, the DQS system allows access to the plurality of data sources through centralized functionality using a standard protocol. Notably, each of the plurality of data sources is accessible through the DQS system using the standard protocol, and in order to access the plurality of data sources each of the protocols that may be necessary for each of the data sources need not be used. Instead, the centralized access provides for access of the plurality of data sources using the standard protocol.

The DQS system of the present disclosure discovers one or more data sources available on a network. Metadata describing each of the discovered data sources is stored locally. Then, based upon a user input, the system generates one or more DQS's for performing action on, retrieving from or otherwise accessing the one or more data sources. The DQS may then be executed such that access to the data sources is provided using a common standard protocol.

Figure 1:
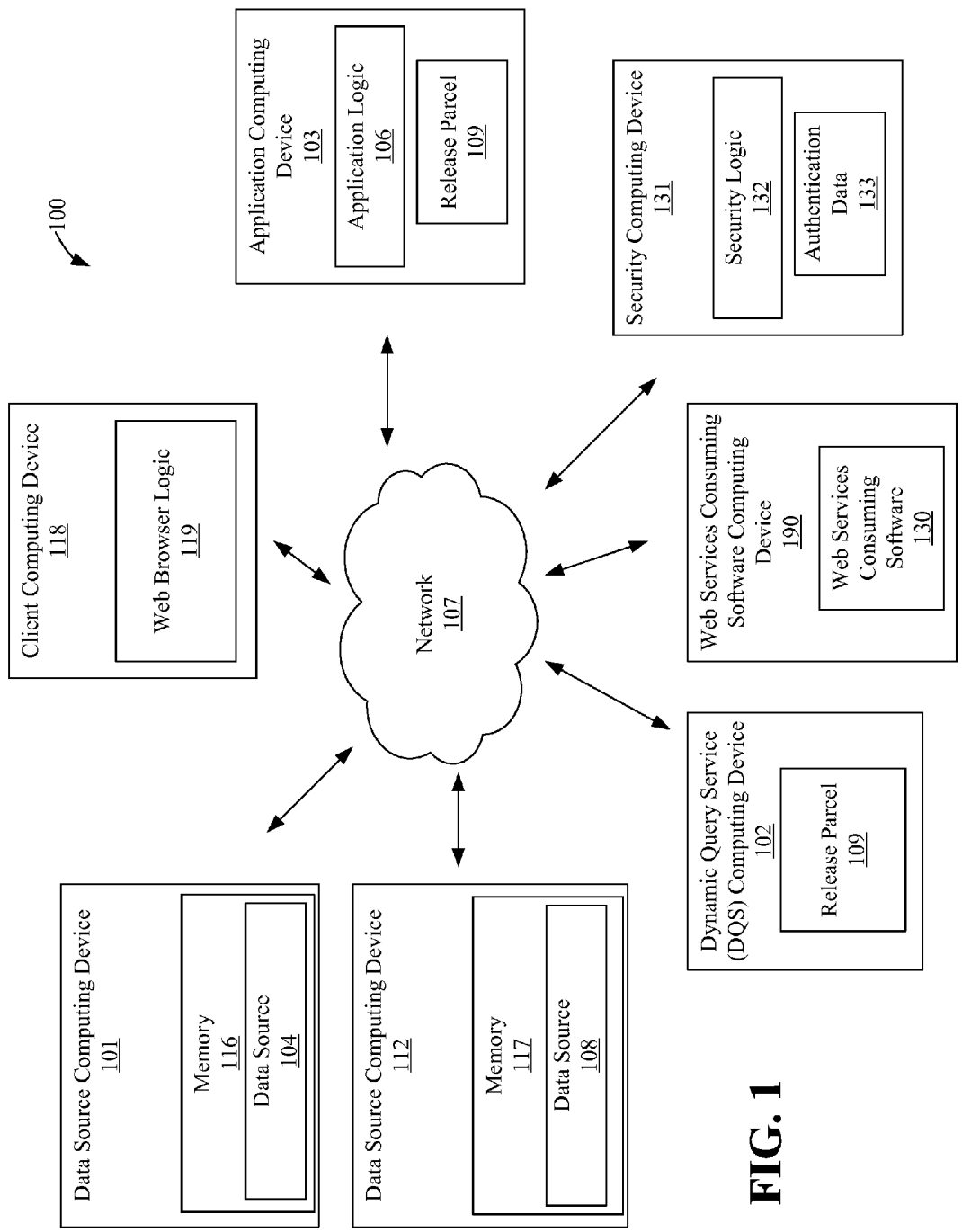
FIG. 1 is a block diagram illustrating an exemplary dynamic query service (DQS) system in accordance with an embodiment of the present disclosure.

FIG. 1 depicts an exemplary DQS system 100 in accordance with an embodiment of the present disclosure. The DQS system 100 comprises a DQS computing device 102 and a plurality of data source computing devices 101 and 112. In addition, the system 100 comprises an application computing device 103, a Web services computing device 190, and a client computing device 118. The data source computing devices 112 and 101, the DQS computing device 102, the application computing devices 103 and 114, the Web services computing device 190, and the client computing device 118 communicate over a network 107. In one embodiment, the network 107 is a private network. However, other types of networks may be used in other embodiments.

Note that two data source computing devices 101 and 112 are shown in FIG. 1 for exemplary purposes. Additional or fewer data source computing devices may be used in other embodiments of the present disclosure. Further note that one application computing device 103 is shown in FIG. 1 for exemplary purposes. Additional application computing devices may be used in other embodiments of the present disclosure. Further note that only one client computing device 118 is shown in FIG. 1 for exemplary purposes. However, additional client computing devices may be used in other embodiments of the present disclosure.

The data source computing devices 101 and 112 comprise data sources 104 and 108, respectively, that are external to the client computing device 118, application computing device 103 and DQS computing device 102. The data sources 104 and 108 are stored in memory 116 and 117, respectively, and are resident on the data source computing devices 101 and 112. The data sources 104 and 108 can be, for example, databases, Web services systems, software applications, or other information or code of interest to a user.

Note that the term "Web services systems" can refer to various types of systems. In one embodiment, a Web services system refers to logic that defines one or more services in a Web Services Definition Language (WSDL) file, and the services are defined by an identifier and respective description of the service, e.g., its inputs and outputs. The term "services" can broadly refer to services and/or objects contained in the data sources 104 and 108 to which a user may desire to deploy to the DQS computing device 102. For example, services can include database tables, database functions, database procedures, database packages, or database views.

Further note that in other embodiments, the Web services system can create DQSs that use different message standards that follow a variety of information exchange protocols. For example, the Web service system may create DQSs that use Extensible Markup Language (XML) that follow the Simple Object Access Protocol (SOAP) standard, i.e., a standard for communicating with Web services identified in a Uniform Description, Discovery and Integration (UDDI) file and which are described in a WSDL file. In yet another embodiment, a Web service system can create RESTful DQSs, which do not have WSDLs but simply use HTTP protocol wherein all the parameters and data are included in the HTTP request. Other protocols may be used in other embodiments of the present disclosure.

In one embodiment of a Web services system the WSDL file created identifies a Web Service and describes what the particular Web Services does. In addition, the Web services system may use different communication protocols in performing its message negotiation and transmission, e.g., Remote Procedure Call (RPC) or Hypertext Transfer Protocol (HTTP).

When the data source 104 or 108 is a database, the data source 104 or 108 may comprise data components and/or programmatic components. Data components may include database tables and views, as described hereinabove. Programmatic components may include database packages, procedures and functions, as described hereinabove. The data source 104 or 108 may be a database that houses data indicative of employees within an organization, for example. Such an exemplary data source 108 may include objects such as tables or views storing employee's names, telephone numbers, and birthdates. These described tables or views are data components.

In addition, the data source 104 or 108 may include objects such as procedures or functions for modifying data in the tables or views. For example, there may be a function for retrieving an employee record corresponding to an identified employee from a table, e.g., an object "gettable." In such an example, the function for retrieving the record is a programmatic component, and the function has as an input defined by data indicative of a name of an employee. In addition, the function has an output defined by the identified employee's record, e.g., the employee's telephone number and birth date. This function is a programmatic component. Note that a "function" may be different from a "procedure," described herein, in that the function may have inputs and/or outputs. Whereas, a procedure may not have inputs or outputs.

When the data source 104 or 108 is a database, it may be an Oracle® application database and implemented with a database management system (DBMS). Note that the DBMS comprises logic that allows a user or an application program to view, extract, modify, and add data to the application database. For example, the DBMS may enable a function that, when called, allows a user (not shown) to add a new employee to a particular table in the external data source 108, e.g., "addEmployee."

The data source 104 or 108 may be accessed by the application computing device 103 via a number of different types of devices. Such devices include but are not limited to Java Database Connectivity (JDBC) drivers. The Web services may be accessed using other distinct data source protocols known in the art or future-developed.

When the data source 104 or 108 is a software program, it may use a defined application program interface (API) (not shown). An API is a set of logic, including, for example, functions, procedures, and protocols that the software program uses in order to operate on a particular operating system, library, or service.

Regardless of the type of data source 104 and 108, application logic 106 on the application computing device 103 discovers and retrieves descriptive information over the network 107 indicative of the many different data sources 104 and 108. Such data discovered and retrieved includes the location of the data sources 104 and 108 and its services and/or objects that are included in the data sources 104 and 108. Such data is hereinafter referred to as "metadata."

The metadata identifying and describing the data sources 104 and 108 and their objects includes, for example, the name of the object, the number and type of inputs for the object, the number and type of outputs for the object, and/or a Unique Resource Locator (URL) or a Uniform Resource Identifier (URI). The application logic 106 creates a repository of such metadata. Note that the URL is a compact string representation of an information resource on the network 107.

The manner in which the application logic 106 retrieves the data indicative of the data sources 104 and 108 and its services and/or objects is based upon the type of data source 104 and 108. For example, if the data source 104 or 108 is a Web services system, as described hereinabove, the application logic 106 may retrieve service and/or object identifiers and corresponding descriptions from a Uniform Description Discovery and Integration (UDDI) stored on the data source computing device 101 or 112, respectively. A UDDI is an XML-based registry that includes information about where particular Web services are located on the internet.

Once the metadata indicative of the services and/or objects and their corresponding descriptions are retrieved from the data sources 104 and 108, the application logic 106 generates a release parcel 109 based upon user input, which is described further herein. Such release parcel 109 includes data and software for accessing one or more of the services and/or objects of the data sources 104 and 108, which is, in one embodiment, selected by a user of the application computing device 103.

Note that one release parcel 109 is shown depicted in FIG. 1. One release parcel 109 is shown for exemplary purposes only, and the application computing logic 106 may generate additional release parcels in other embodiments. For brevity, only one release parcel 109 will be discussed herein as the DQS system 100 is described. Notably, when there are additional release parcels, such release parcels may be generated simultaneously or may be generated independent of any other release parcel, and the services and/or objects and corresponding descriptions are included in each release parcel separately, based upon a user input as described further herein.

In this regard, the client computing device 118 comprises Web browser logic 119. The user of the client computing device 118 enters a URL in the Web browser logic 119, which contacts the application logic 106. The application logic 106 then transmits data indicative of user interfaces to the client computing device 118, which the Web browser logic 119 displays to the user. Such graphical user interfaces are for receiving information for generating the release parcel 109, and such interfaces are described further herein.

In the present disclosure, the release parcel 109 comprises data identifying a dynamic query service (DQS). To generate the release parcel 109, the DQS computing device 102 receives from the user (not shown) via Web browser logic 119 on the client computing device data indicative of a DQS to be included in the release parcel 109. In one embodiment, the user may desire to include a DQS in a release parcel so that the data source associated with the DQS can be accessed remote from the data source.

The user need not identify the data source computing device 101 or 112 and the corresponding data source 104 or 108, respectively. If the user does not identify the data source computing device 101 or 112 and the corresponding data source 104 or 108, respectively, the application computing device 103 creates a service that has a variable parameter entry field for identifying the data source computing device 101 or 112 and the corresponding data source 104 or 108, respectively.

However, in some embodiments of the present disclosure, the user does identify the data source computing device 101 or 112 and the corresponding data source 104 or 108, respectively. In such an embodiment, the application computing device 103 creates a DQS for the identified DQS that specifically connects to the data source identified.

In one embodiment, the release parcel 109 or 110 is a Web services system. In such an embodiment, the DQS computing device 102 generates components (not shown) that define a Web services system, including, for example a WSDL file and wrapper logic (not shown) for communicating with, e.g., transmitting messages to/from, the data sources 104 and 108. Each of these components is described further with reference to FIG. 2.

When a particular release parcel 109 is completed, the application computing device 103 deploys the release parcel 109 to the DQS computing device 102, based upon a user input. In this regard, the user may designate that release parcel 109 be generated and deployed to the DQS computing device 102. In one embodiment, the application logic 106 may display a list of computing devices to the user, and the user selects from the list the computing device to which the user desires to deploy release parcel 109, e.g., the DQS computing device 102.

As described hereinabove, the client computing device 118 comprises Web browser logic 119. The Web browser logic 119 may be any type of logic for retrieving, presenting, and navigating throughout information resources identified by a URL over the network 107. The URL may identify an information resource that may be a Web page, image, video, file, or other piece of content. Such Web browser logic 119 may be used to access the application logic 106 of the application computing device 103 and any services contained in the release parcel 109. Exemplary Web browsers include Netscape™, Internet Explorer™, or Mozilla Firefox™. Such Web browser logic 119 is described further herein.

Once the release parcel 108 is deployed to the DQS computing device 102, then services contained in the release parcel 109 are ready for consumption. In order to consume the services contained in the release parcel, Web services consuming software 130 stored on Web services consuming software computing device 190 can be used. In one embodiment, the Web services consuming software 130 is SOAPui. SOAPui (which stands for Simple Object Access Protocol User Interface) is a tool for testing and debugging Web services.

During operation, the user would enter an operation to be performed on one of the data sources 104 and 108. For example, the user may enter an structured query language (SQL) statement for retrieving data from a table on the data source 104 or 108. The Web services consuming software 130 wraps the SQL statement in a SOAP request. The release parcel would then receive the data indicative of the operation and execute the operation on the data source. When data is received from the execution of the operation, such data is then displayed to the user through the Web services consuming software 130.

In addition, the DQS system 100 further comprises a security computing device 131. The security computing device 131 comprises security logic 132 and authentication data 133. As described hereinabove, during execution of the release parcel 109, a user submits an operation that is to be performed on the data source 104 or 108 through the Web services consuming software 130 to the release parcel 109. Such request, in addition to comprising data indicative of the operation to be performed on the data source 104 or 108, would also include authentication data, such as a username and password. Upon receipt of the username and password, the release parcel 109 requests authentication of the username and password from the security computing device 131. In operation, the release parcel 109 transmits a request comprising the authentication data to the security computing device 131. The security logic 132 receives the request and compares the received authentication data with the authentication data 133 stored in the security computing device 131. If a match is found, the security logic 132 transmits a response back to the release parcel 109 indicating successful authentication.

In one embodiment, in addition to containing authentication information, such as valid usernames and corresponding passwords, the authentication data 133 further comprises a role associated with the username and password. In such an embodiment, the security logic 132 would transmit a response indicating that the provided username and password are valid, and the response would further comprise data indicating the role associated with the username and password. Such username/password and role association can be configured during the generation of the release parcel 109.

In such an embodiment, the release parcel 109 receives the response indicating that the username and password is valid and data indicative of the role associated with the username and password. The release parcel 109 would then determine whether the user is authorized to execute the request sent from the Web services consuming software, based upon the role contained in the response from the security computing device. In this regard, when the release parcel 109 is generated, different roles may be associated with the release parcel, and the different roles may define what services and/or objects that the user having a particular role is allowed to access. Thus, based upon the role, the release parcel 109 may limit the actions that the user can take through the Web services consuming software with respect to a particular data source 104 and 108. Such process is described further herein.

Figure 2:
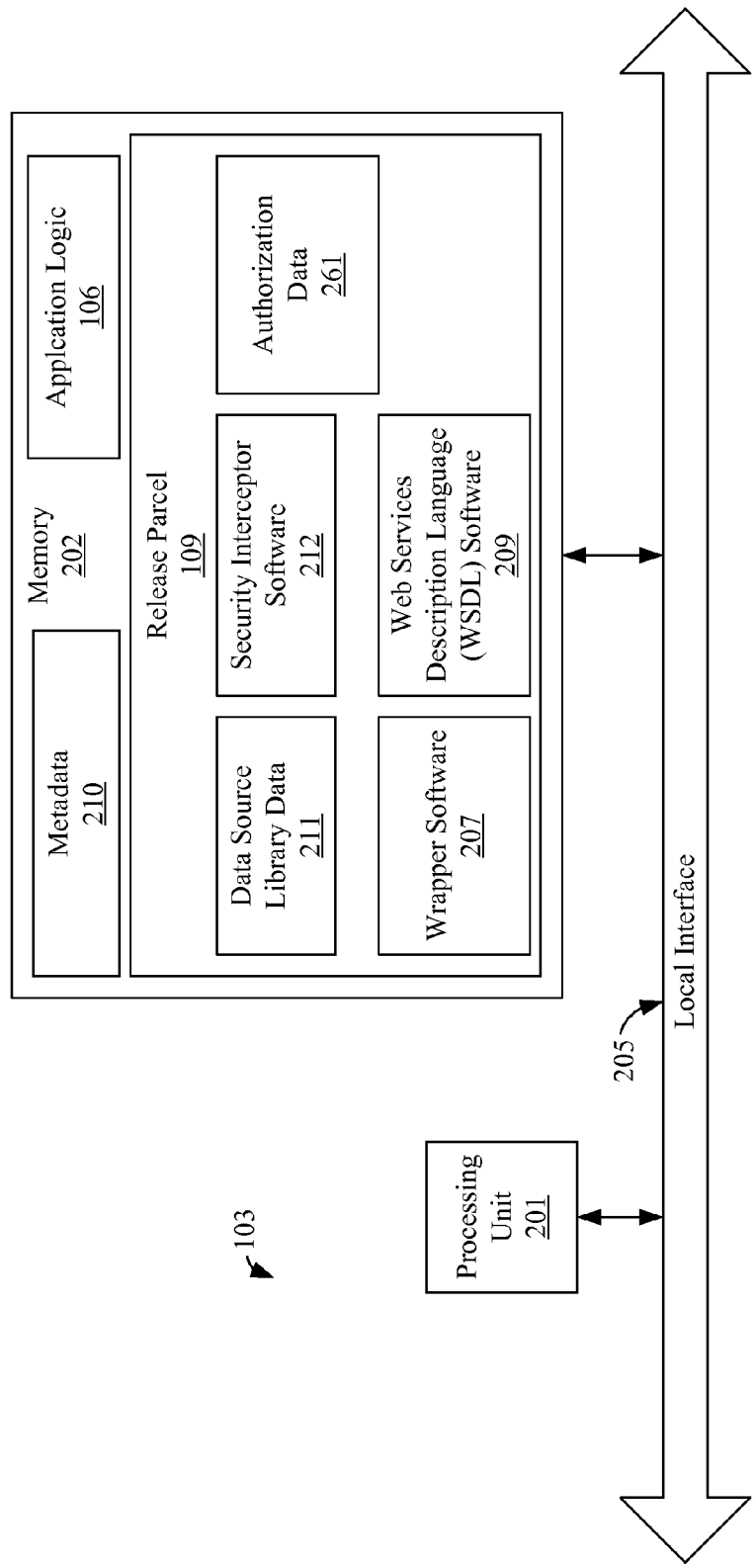
FIG. 2 is a block diagram illustrating an exemplary application computing device as depicted in FIG. 1.

FIG. 2 depicts an application computing device 103 in accordance with an embodiment of the present disclosure. The exemplary application computing device 103 generally comprises a processing unit 201 and memory 202.

The application computing device 103 further comprises the application logic 106. The application logic 106 can be software, firmware, hardware, or any combination thereof. In the exemplary application computing device 103, the application logic 106 is shown as software stored in memory 202. In addition, memory 202 stores data indicative of the release parcel 109. Note that the present disclosure describes the generation of only the release parcel 109 for brevity. Further note that other release parcels can be generated in a same or similar manner as the release parcel 109.

The application logic 106 generates the release parcel 109. The release parcel 109 comprises those components needed to execute a DQS. Such components include, but are not limited to wrapper software 207, WSDL software 209, security interceptor logic 212, authentication data 261, and data source library data 211. WSDL is used for exemplary purposes only, and other protocols may be used in other embodiments of the present disclosure.

The processing unit 201 may be a digital processor or other type of circuitry configured to run the application logic 106 by processing and executing the instructions of the application logic 106. The processing unit 201 communicates to and drives the other elements within the application computing device 103 via a local interface 205, which can include one or more buses.

When stored in memory 202, the application logic 106 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain or store the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

During operation, the application logic 106 discovers services and/or objects available on the data source computing devices 101 (FIG. 1) and 112 (FIG. 1) and corresponding data sources 104 (FIG. 1) and 108 on the network 107 (FIG. 1). In one embodiment, a user of the client computing device 118 provides the application logic 106 connection information corresponding to the data sources 104 and 108. Such connection information includes the host name, the port number, and the database name. In another embodiment, the application logic 106 transmits a message over the network 107 (FIG. 1) that is communicated to each internet protocol (IP) address on the network. In such an instance, the message is a request for a response from data sources (e.g., data sources 104 and 108). The data sources on the network 107 in response transmits a message to the application logic 106 providing certain connection information, e.g., information related to the host name (the server name), the port number on which the data source is running, and the data source name.

In one embodiment, the application logic 106 comprises a Java Database Connectivity (JDBC) driver. In such an embodiment, each of the data sources 104 and 108 further comprises a JDBC driver. The JDBC driver connects to the data source and implements the protocol for transferring a query and a result between the application logic 106 and the data source 104 and 108, regardless of the type of data source. In order to discover services and/or objects contained in the data source 104 and 108, a JDBC call may be made to the data source 104 and 108, and the data source 104 and 108 would return, in response to the call, all the services and/or objects available in the data source 104 and 108. The application logic 106 stores such data identifying the discovered data sources 104 and 108 and available services and/or objects as metadata 210.

In this regard, the metadata 210 comprises the connection information for the data source 104 and 108. In addition, for each data source 104 and 108 the metadata comprises data indicative of all the services and/or objects available by the data source 104 and 108. With respect to the services and/or objects available by the data source 104 and 108, if the metadata 210 defines functions and/or procedures related to the data source, the metadata 210 further comprises inputs and/or output of the functions and/or procedures. In addition, the metadata 210 may further comprise credentials (usernames and passwords) related to the data source 104 and 108.

Once the metadata 210 has been obtained and stored on the application computing device 103, the application logic 106 then generates a release parcel based upon user input, which is now described in detail. In this regard, the application logic 106 receives from a user of the client computing device 118 data indicating that the user desires to create a DQS.

As indicated hereinabove, the metadata 210 comprises data indicative of the connection information (e.g., host name, port number, and data source name) for each of the data sources 104 and 108. Thus, once a user indicates that the user desires to create a DQS, the application logic 106 displays a list of the available data sources 104 and 108 to the user, which the application logic 106 retrieves from the metadata 210. The user then selects which data source 104 and 108 for which the user desires to create a DQS.

Once the user selects the data source 104 and 108 for which the user desires to create the DQS and the database user credentials, the user then selects to generate the release parcel 109. Notably, the user may elect to generate the release parcel 109 or generate and deploy the release parcel 109, which is described further herein.

In one embodiment, the user enters data identifying the data source computing device 101 or 112 and data source 104 or 108, respectively, for which the user desires to generate the DQS, as described hereinabove. However, if desired, the user need not enter data identifying the data source computing device 101 or 112 and data source 104 or 108. Instead, the data source for the particular DQS being created can be a parameter that is entered when the DQS is executed through the Web services consuming software 130 (FIG. 1), as described further herein.

Once the user elects to generate the release parcel 109, the application logic 106 generates the software and data, including the WSDL software 209, the wrapper software 207, the data source library data 211, the security interceptor software 212, and the authentication data 261, that make up the release parcel 109. Note that there is only one WSDL software 209, wrapper logic 107, data source library data 211, and security interceptor software 212, which would be the software needed to execute a single DQS. The release parcel 109 may comprises additional WSDL software 209, wrapper software 207, data source library data 211, and security interceptor software 212 for executing additional DQS's in other embodiments. For brevity and simplicity, the description of the software generation for the release parcel 109 is described further herein to include the software needed for executing a single DQS.

The application logic 106 generates the data source library data 211 by placing in the data source library data 211 the connection information for the data source 104 and/or 108 that was selected by the user. If the user did not select a particular data source 104 and 108, the application logic 106 stores as the data source library data 211 the connection information for all the data sources 104 and 108 available as indicated in the metadata 210.

The application logic 106 also generates the WSDL software 209 for the DQS for the selected data source 104 and 108 and its services and/or objects described in the metadata 210. In this regard, the application logic 106 customizes predefined WSDL software with parameters taken from the metadata 210. As an example, the predefined WSDL software may be XML software for defining a Web service. The application logic 106 generates the WSDL software 209 by using the predefined software and inserting specific data related to the services and/or objects contained in the metadata 210 for the particular data source. In this regard, the WSDL software 209 describes the actual functions that are available for the data source 104 and 108. The WSDL software 209 created is XML-based software that provides a model for describing each of the Web services created for the data source 104 and 108 and the services and/or objects included for the data source 104 and 108 in the metadata 210. In this regard, the WSDL software 209 generated is XML-based software for the data source 104 and 108 selected that provides the model for describing the services and/or objects available by the data source 104 and 108. The WSDL software 209 comprises data indicative of each of the services and/or objects available, the methods available for the services, including the input and output parameters for the methods, and the return format for data that is received, and all such information is obtained from the metadata 210 to generate the XML-based software in the WSDL software 209. Thus, upon execution of the release parcel 109, the WSDL software 209 will inform the Web services consuming software 130 (e.g., SOAPui) that is executing the release parcel 109 how to talk with the various services contained in the release parcel. For example, the WSDL software 209 tells the Web services consuming software 130 the operations that can be performed on the data source 104 and 108, how to connect to the data source 104 and 108, and what to expect back after the operation is performed. Note that SOAPui is an open-source tool for testing and debugging Web services.

The application logic 106 further generates the wrapper software 207. In this regard, the application logic 106 customizes predefined wrapper software with parameters taken from the metadata 210. As an example, the predefined wrapper software may be Java software for translating an SQL statement into a JDBC call. The application logic 106 generates the wrapper software 207 by using the predefined software and inserting specific data related to the services and/or objects contained in the metadata 210 for the particular data source. The wrapper software 207 allows the Web services consuming software 130 (e.g., SOAPui) to execute a Web service defined in the WSDL data 209. In this regard, the Web services consuming software 130 (FIG. 1) analyzes the WSDL data 209 in order to know how to interact with the wrapper software. The Web services consuming software 130 submits a request to the wrapper software 207 in accordance with the WSDL data 209, and the wrapper software 207 and then generates a call to the data source 104 and 108 for the request received from the Web services consuming software 130. In the example where SOAPui is the end application, the user, during execution, would submit a request in the SOAP language, which contains a user-supplied structured query language (SQL) statement. The wrapper software 207 would receive such request and convert such request into a JDBC call, which can be understood by the data source 104 and 108. Once the wrapper logic 207 receives a request from the end application, the wrapper logic 207 obtains from the data source library data 211 the connection information for the request received from the end application.

As an example, assume that the data source 104 or 108 is an Oracle database. The SOAPui would receive from the user a SQL statement. For example, the SQL statement may be "select * from tablename." The SOAPui passes the SQL statement in as a parameter to the wrapper software 207. The wrapper software 207 then facilitates connecting to the database based upon the connection information contained in the data source library data 211.

Once it knows the connection information for the data source 104 and 108 that it is to connect to for the request, the wrapper software 207 transmits a request containing data indicating the operation to be performed on the data source 104 or 108, the username and password supplied to the Web services consuming software 130, and the connection information. The security interceptor software 212 then determines whether the user that is making the call has the credentials to make such call.

The security interceptor software 212 is software that is also generated by the application logic 106. In this regard, the security interceptor logic 106 contains predefined software for authenticating, authorizing, and executing a JDBC call that is transmitted to the security interceptor software 212 by the wrapper logic 106. Specific data for connecting to the data source 104 and 108 is inserted into the predefined software when the security interceptor software 212 is generated. Notably, the security interceptor logic 212 authenticates the username and password with the security computing device 131. In this regard, the security interceptor software 212 generates a request that contains the username and password and transmits the request to the security computing device 131. The security logic 132 (FIG. 1) receives the request and verifies that the username and password are valid in the username/password data 133. As described hereinabove, the username/password data 133 may further associate with the username and password received a particular role. The security logic 132 transmits a response back to the security interceptor software 212 that contains data indicating whether the username and password are authenticated and data indicative of the role associated with the user name and password.

The security interceptor software 212 receives the response from the security logic 132. The authentication data 261 comprises data identifying one or more roles for the release parcel 109. Associated with each role is data identifying the permissions that the particular role has with respect to the release parcel 109. Thus, once the security interceptor software 212 receives the response, the security interceptor software 212 determines, based upon the role indicated in the response, whether the user associated with the username and password (and corresponding role) is authorized to perform the operation contained in the request sent from the wrapper software 207. If the user does have the credentials, the security interceptor software 212 then connects to the data source 104 and 108 so that the operation can be executed on the data source 104 and 108.

As described above, in order for DQS computing device 102 (FIG. 1) to use DQS's in a release parcel 109, the release parcel 109 is "exposed" to the DQS computing device 102. To expose the release parcel 109 to the DQS computing device 102, the release parcel 109 is deployed to the DQS computing device 102. In this regard, the release parcel 109 is transmitted to the DQS computing device 102 over the network 107 (FIG. 1) and stored for consumption by the Web services consuming software 130, described further with reference to FIG. 3. Note that the release parcel 109 may be in the form of a .war file (Web Archive file) or a .ear (Enterprise Archive file).

Figure 3:
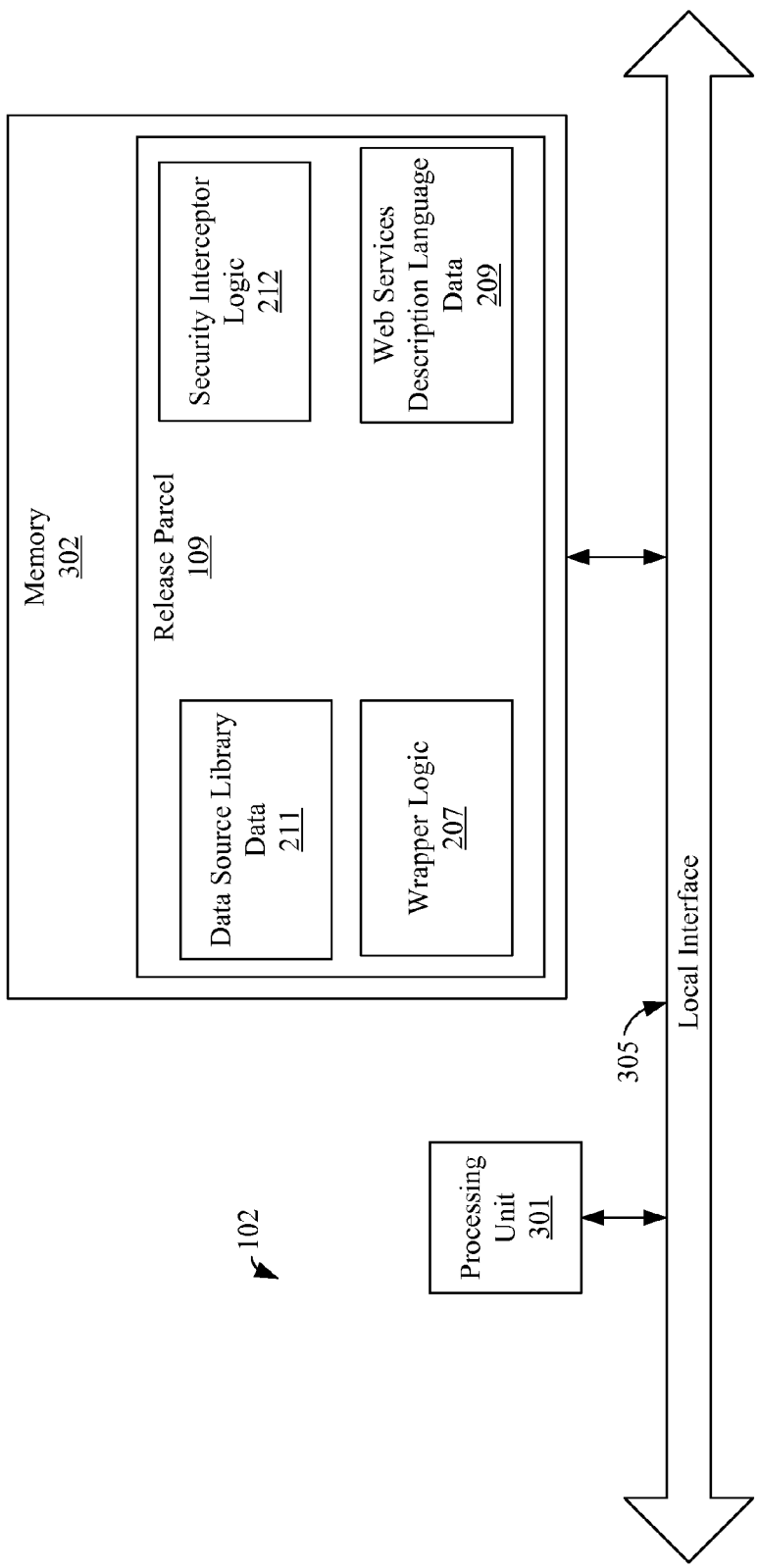
FIG. 3 is a block diagram illustrating an exemplary DQS computing device as depicted in FIG. 1.

FIG. 3 depicts an exemplary DQS computing device 102 in accordance with an embodiment of the present disclosure. The exemplary DQS computing device 102 generally comprises a processing unit 301, memory 302, a display device 306, and an input device 307. In the exemplary DQS computing device 102, the release parcel 109 and the Web services consuming software 130 are shown as software stored in memory 302.

The processing unit 301 behaves substantially identical to the processing unit 301 described with reference to FIG. 3. In this regard, the processing unit 301 communicates to and drives the other elements within the DQS computing device 102 via a local interface 305, which can include one or more buses.

During operation, the user runs the Web services consuming software 130 on the Web services consuming software computing device 190 (FIG. 1). Note that the Web services consuming software 130 may be any logic that is capable of executing, i.e., running, Web services. The user would then point to the WSDL software 209 and the Web services consuming software 130 (FIG. 1) would parse the WSDL software 209 to determine how to interact with the Web service.

The Web services consuming software 130 displays data indicative of the DQS related to the identifier entered. In this regard, the Web services consuming software computing device 190 may display the service identifier and its associated methods, i.e., functions that can be performed on an external data source 104 or 108 (FIG. 1). The user may select one of the functions, for example, one of the functions may receive as input an identifier identifying an data source 104 or 108 and receive a structured query language (SQL) statement for performing on the identified data source 104 or 108.

Once the external data source identifier and the SQL statement are entered, the Web services consuming software 130 transmits the identifier and the SQL statement entered to the wrapper software 207. The wrapper software 207 retrieves the connection information for the identified Web service from the data source library data 211 (FIG. 2), and transmits a JDBC call indicative of the SQL statement to the security interceptor software 212, which ensures that the user has access to the data source for the particular Web service that is being consumed, as described hereinabove.

The security interceptor software 212 then transmits the SQL statement to the identified data source 104 or 108. The data source computing device 101 or 112 runs the SQL statement on the identified external data source 104 or 108 and returns data responsive to the SQL statement to the wrapper software 207. The wrapper software 207 transmits the data responsive to the SQL statement to the Web services consuming software 130, and the Web services consuming software 130 displays the responsive data to the display device 306.

FIGS. 4-11 depict exemplary graphical user interfaces (GUIs) 400-800 displayed by the application logic 206 (FIG. 2) in the Web browser logic 119 (FIG. 1) during an exemplary implementation of the DQS system 100 (FIG. 1). Note that the following text describing FIGS. 4-11 describes one exemplary implementation of the DQS system 100, and other implementations are possible in other embodiments.

Figure 4:
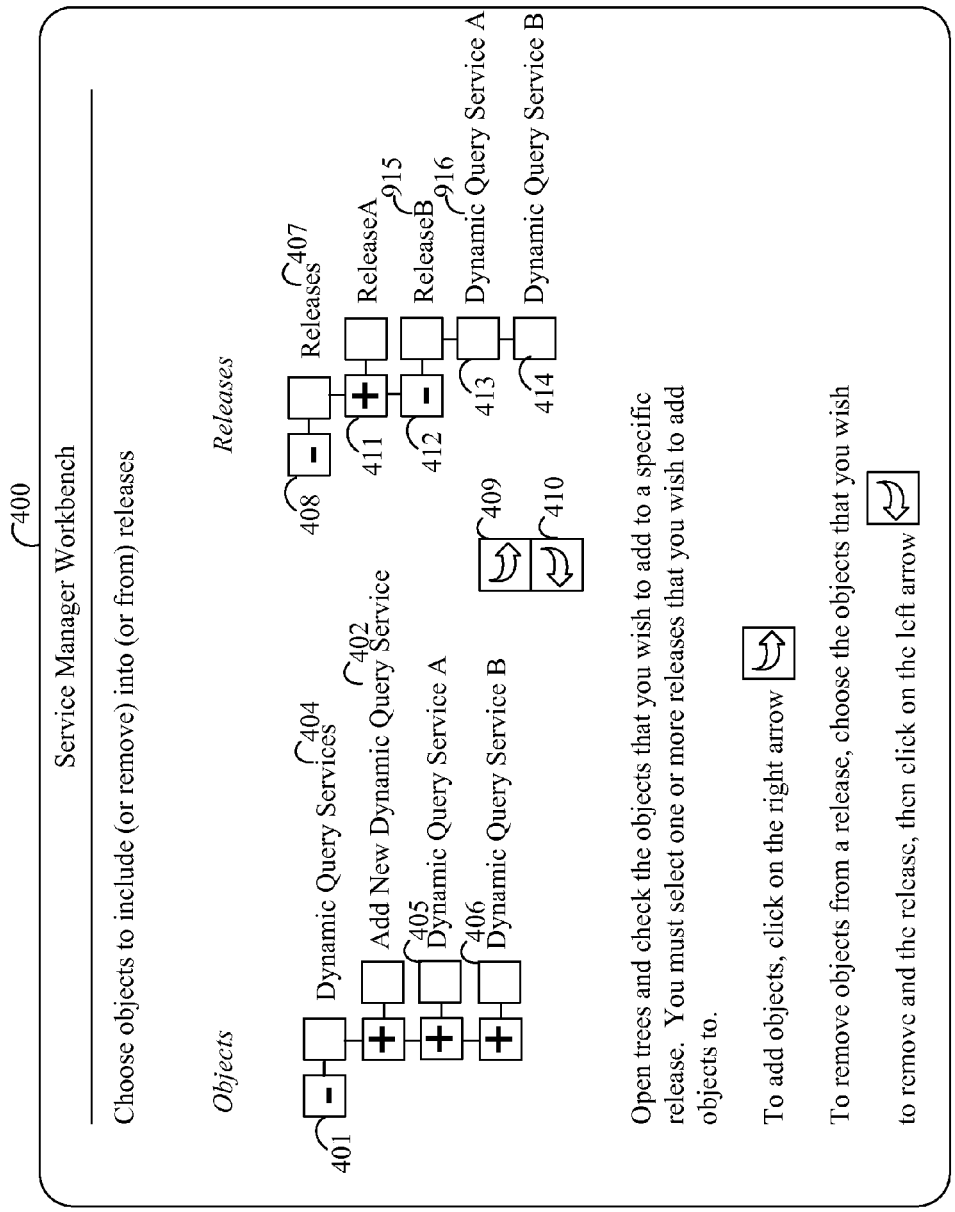
FIG. 4 depicts an exemplary graphical user interface (GUI) of the DQS system in FIG. 1 for identifying an object to be included in a release parcel.

FIG. 4 depicts an exemplary "Service Manager Workbench" GUI 400 of the DQS system 100 (FIG. 1) that is displayed by the application logic 106 to the Web browser logic 119 (FIG. 1). The GUI 400 comprises a "Dynamic Query Services" object 404 corresponding to a check box 401. When the check box 401 is selected, and "Add New Dynamic Query Service" link 402 is displayed. In addition, any DQSs that have already been created are listed, e.g., "Dynamic Query Service A" and "Dynamic Query Service B," which correspond to check boxes 405 and 406, respectively.

In order to create a DQS a user (not shown) selects the "Add New Dynamic Query Service" link 402. In response, the application logic 106 displays the "Build a Dynamic Query Service" GUI 500 depicted in FIG. 5, which is described further herein.

The "Service Manager Workbench" GUI 400 further comprises a "Releases" tag 407 corresponding to a check box 408. When the check box 408 is selected, releases that have already been generated in the DQS system 100 (FIG. 1) appear in the list, e.g., "ReleaseA" and "ReleaseB," which correspond to check boxes 411 and 412, respectively.

Figure 5:
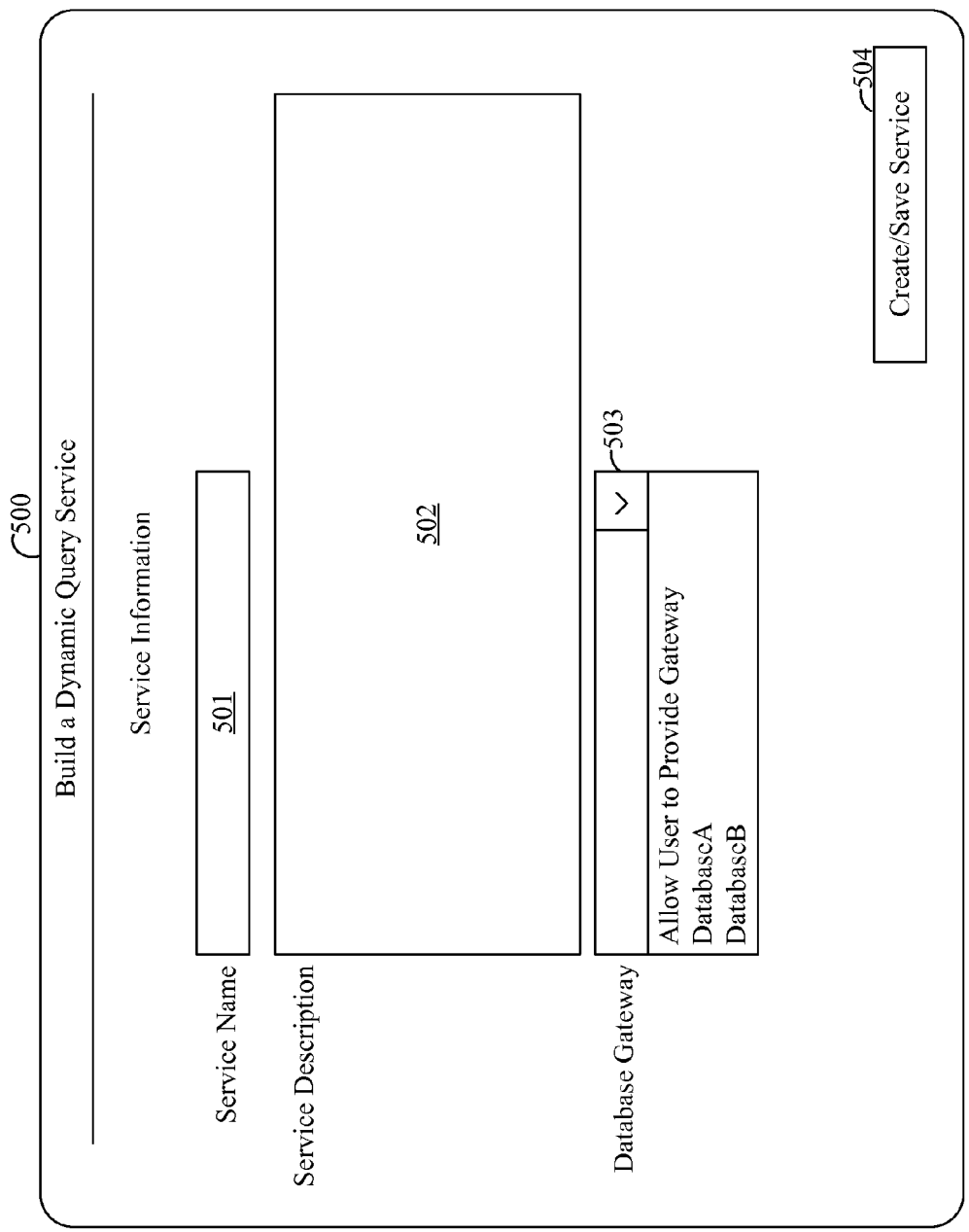
FIG. 5 depicts an exemplary GUI of the DQS system of FIG. 1 for building a DQS for inclusion in a release parcel.
Figure 6:
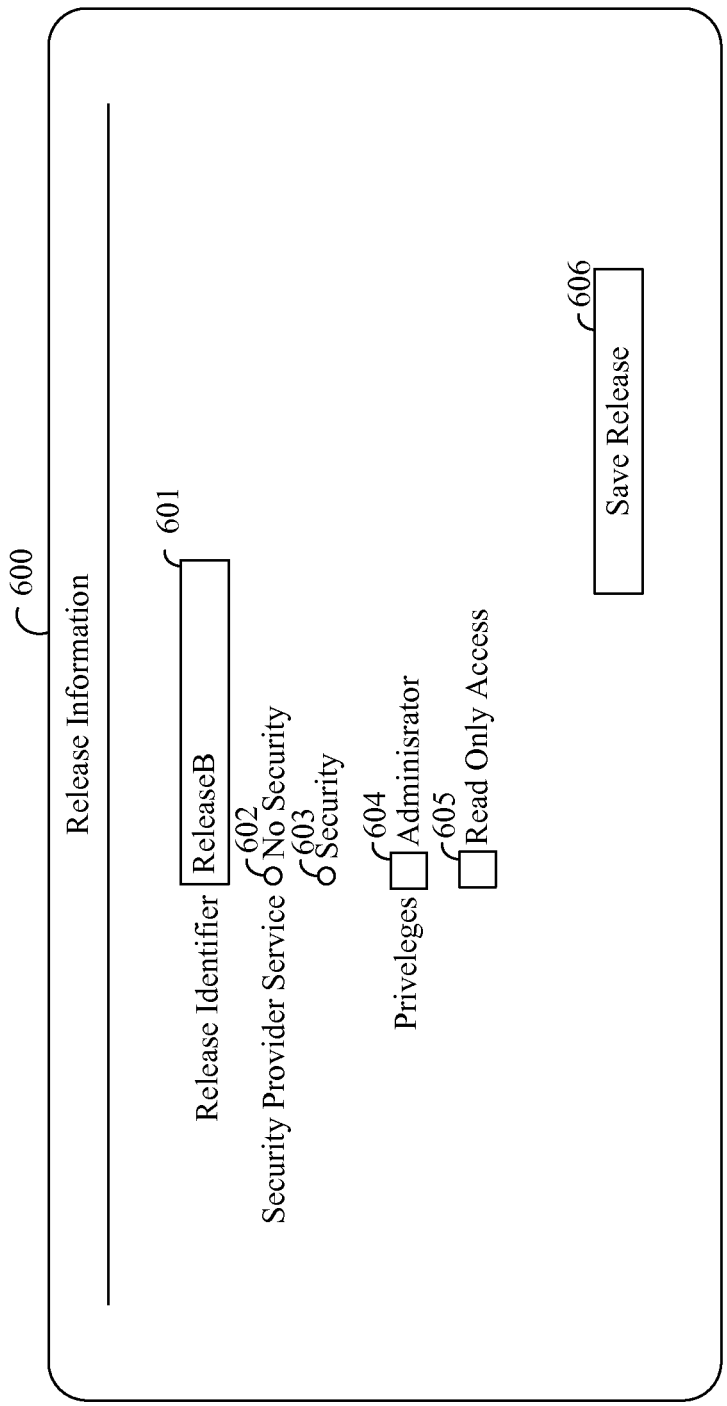
FIG. 6 depicts an exemplary GUI of the DQS system of FIG. 1 for identifying security parameters for a release parcel.
Figure 7:
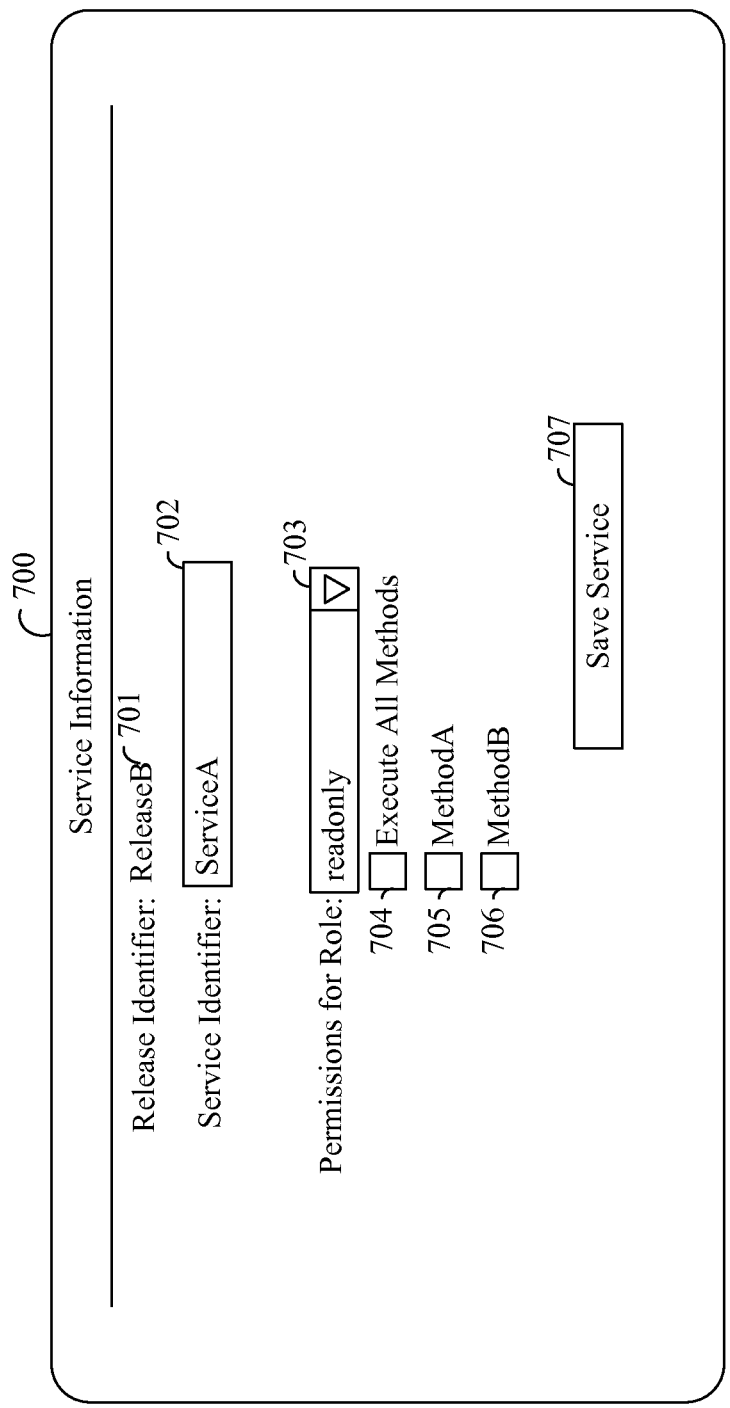
FIG. 7 depicts an exemplary GUI of the DQS system of FIG. 1 for identifying security parameters for a service.
Figure 8:
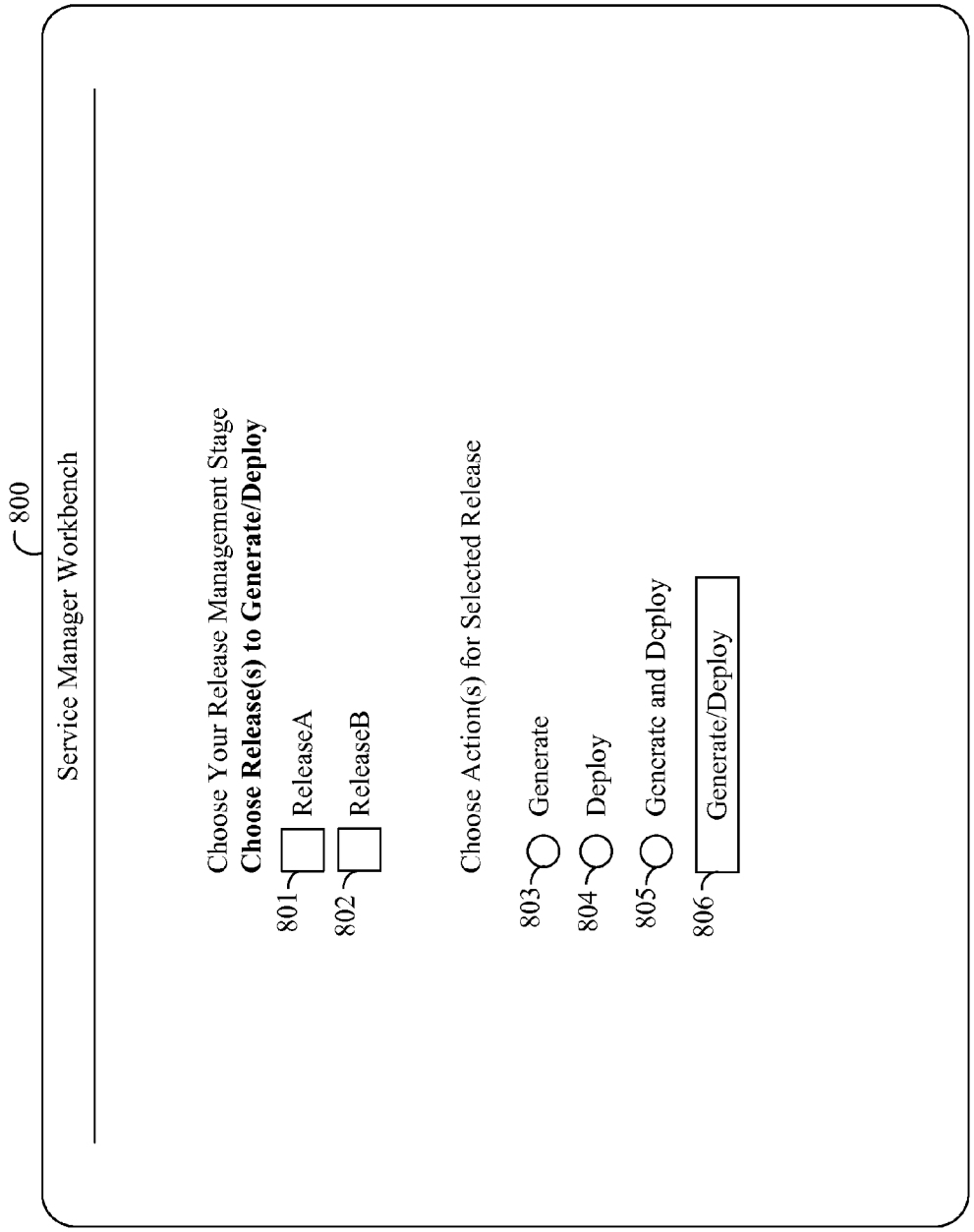
FIG. 8 depicts an exemplary GUI of the DQS system of FIG. 1 for selecting a release that is to be generated and/or deployed to an application computing device of FIG. 3.

In the exemplary GUI 500 depicted in FIG. 5, the check box 412 has been selected. When the check box 412 has been selected, a list of all the DQS services that have been added to the "ReleaseB" are listed, e.g., "ServiceA" and "ServiceB," which correspond to check boxes 413 and 414, respectively. In order to add a DQS to a release, the user would select the box corresponding to the DQS in the "Objects" list, select the box corresponding to the release in which the user desires the DQS to be included, and select the arrow button 409. The DQS selected would then be added to the release. In this regard, the application logic 106 would generate metadata 210 (FIG. 2) that associates the selected DQS with the selected release. In order to remove a DQS from a release, the user would select the box corresponding to the DQS in the "Releases" list and select the arrow button 410, which would remove the service from the release. In this regard, the application logic 106 would disassociate the selected DQS from the release in the metadata 210.

As indicated hereinabove, in order to create a DQS, the user selects the "Add New Dynamic Query Service" link 402. In response, the application logic 106 displays the "Build a Dynamic Query Service" GUI 500 depicted in FIG. 5. GUI 500 comprises a text field 501, and the user can enter data indicative of a DQS Identifier identifying a "Service Name" to be associated with the DQS being created. In addition, the user can enter data in text field 502 indicative of the "Service Description." In one embodiment, entry of "Service Description" data is optional.

The GUI 500 further comprises a pull down menu 503 for selecting data related to the "Database Gateway" that the user desires to be associated with the DQS being created. When the pull down menu 503 is selected, the application logic 106 displays a "Allow User to Provide Gateway" selection and further displays a list of all existing databases that have been configured in the application logic 106, which were discovered in the discovery process described hereinabove. For example, GUI 500 lists DatabaseA or DatabaseB. Thus, the user can select one of the listed databases to associate with the DQS that is being created. Two databases, e.g., DatabaseA or DatabaseB, are shown for exemplary purposes. Any number of databases may be listed in the pull down menu 503 depending upon the number of data sources 104 (FIG. 1) and 108 (FIG. 1) that have been discovered in the discovery process described further hereinabove.

If the user selects "Allow User to Provide Gateway," the application logic 106 generates a DQS where no particular external data source is specified. Instead, a user can enter an identifier into a parameter when using the Web services consuming software 130 for identifying an data source when the DQS is executed. Thus, when the Web services consuming software 130 (FIG. 1) displays data related to a function of the particular DQS, there is a modifiable parameter in which the user can specify the data source 104 or 108 (FIG. 1) for which the user desires to run the function.

The user can select one of the listed databases to use for the DQS that is being created. If the user selects one of the listed databases, when the release parcel 109 is generated, the connection information for the selected database is included in the data source library data 211. The wrapper software 207 then uses the connection information for the database selected when the wrapper software 207 receives a request to perform an operation on the database to generate the request that is transmitted to the security interceptor software 212.

If the user specifies "Allow User to Provide Gateway," when the release parcel 109 is generated that includes the DQS, connection information for all of the data sources 104 and 108 that are found in the discovery process are included in the data source library data 211. Thus, when the wrapper software 207 (FIG. 2) receives a request from the Web services consuming software 130 to perform an operation on a database, which is specified in the request, the wrapper software 207 can locate the connection information for the particular database specified in the request in the data source library data 211. The wrapper logic 207 (FIG. 2) can then use the connection information to generate the request that is then transmitted to the security interceptor software 212 (FIG. 2).

Once the user has entered the information into the GUI 500, the user selects the "Create/Save Service" button 504. When the button 504 is selected, the application logic 106 creates the information in the metadata 210 related to the DQS that is created that is then used when a release parcel 109 is generated that includes the DQS that is created.

Further, once the DQS has been created and saved by selection of the "Create/Save Service" button 504, when the user returns to the "Service Manager Workbench" GUI 400 depicted in FIG. 4, the DQS created now appears in the "Objects" list.

In addition, from the "Service Manager Workbench" GUI 400, the user can select one of the releases, for example "ReleaseB" link 915. When selected, the application logic 106 displays the "Release Information" GUI 600 depicted in FIG. 6. The "Release Information" GUI 600 allows the user to set up security on the release level. In this regard, the "Release Identifier" is depicted in text field 601. The user can then select radio button 602 or 603 to select whether security will be applied and to what role security will be applied, e.g., "Administrator" corresponding to check box 604 or "Read Only Access" corresponding to check box 605.

Note that the roles available, e.g., "Administrator" and "Read Only Access" have been pre-configured in the DQS system 100. While only two roles are shown, the DQS system 100 may have any number of different roles, and the user can identify security policies for each role. As described hereinabove, if security is applied to a release, the username and password will be supplied when the release parcel 109 is executed by the Web services consumption software 130. Thus, when the user of the release parcel 109 requests an operation on a database through the DQS that is included in the release parcel 109, the user will supply the username and password. The wrapper software 207 (FIG. 2) will generate the call to the security interceptor software 212 (FIG. 2), which includes, for example, the SQL statement provided in the Web services consumption software 130. In addition, the call to the security interceptor software 212 will include the username and password and the connection information obtained from the data source library data 211.

In addition, security can be configured for a DQS in addition to configuring security for an entire release. In this regard, from the "Service Manager Workbench" GUI 400, the user can select a particular DQS link, for example "Dynamic Query ServiceA" link 916. When the user selects the link 915, the application logic 106 displays the "Service Information" GUI 700 depicted in FIG. 7.

The "Security Information" GUI 700 comprises a "Release Identifier" 701, e.g., "ReleaseB," that identifies the release that the DQS is in. In addition, the GUI 700 comprises a "Service Identifier" text field 702 that identifies the DQS. In addition, the GUI 700 comprises a "Permissions for Role" pull down menu 703 and an "Execute All Methods" selection box 704 and "MethodA" and "MethodB" selection boxes 705 and 706, respectively. Note that two method selection boxes 705 and 706 are shown for exemplary purposes. The number of method boxes 705 and 706 that will be displayed by the application logic 106 in the list will be the number of methods that are contained in the metadata 210 associated with the DQS that is identified in text field 702.

The user can then select the pull down menu 703. The pull down menu 703 comprises a listing of all the roles that have been configured using the application logic 106. The user can then select, for the role selected, those methods that the role has access to. Such role/method data is stored as authorization data 261 (FIG. 2).

As described hereinabove, a user is associated with a username and password, which is then associated with a role. When the username and password are authenticated with the security computing device 131, the security logic 132 (FIG. 1) transmits data indicating whether authentication has passed or failed and data indicative of the role associated with the username and password. Thus, once the security interceptor software 212 (FIG. 2) receives the authentication from the security computing device 131, the security interceptor logic 212 can look up the role in the authorization data 261 to determine if the operation that the user desires to perform, as indicated in the request from the wrapper software 207, is allowed based upon the role assigned to the username and password. Such role assignment to the username and password is preconfigured in the application logic 106.

Once the user has selected all the DQSs that the user desires to be included in the release parcel 109, then user then generates and deploys the release parcel 109. In this regard, the application logic 106 displays GUI 800 depicted in FIG. 8. GUI 800 enables the user to generate a release parcel and/or deploy a release parcel to a particular DQS computing device 102. In this regard, GUI 800 comprises check boxes 1101 and 1102 for selecting "ReleaseA" and/or "ReleaseB." The user can then select the action that is to be performed for the selected release. In this regard, the GUI 800 comprises selectable buttons 803-805 so that the user can indicate whether to "Generate," "Deploy," or "Generate and Deploy," respectively. The user then selects the "Generate/Deploy" pushbutton 806.

If the user selects the "Generate/Deploy" pushbutton 806, the application logic 106 generates the selected release parcel, i.e., "ReleaseA" or "ReleaseB." Once the release parcel is generated, the application logic 106 then deploys the release parcel selected to the DQS computing device 102 (FIG. 1). Further, if the deploy button 804 is selected the application logic 106 deploys the selected release parcel, i.e., "ReleaseA" or "ReleaseB." In this regard, the application logic 106 deploys the selected release parcel, i.e., "ReleaseA" or "ReleaseB," to the DQS computing device 102.

Note that the application logic 106 generates the release parcel 109 that includes the data source library data 211, the wrapper software 207, the security interceptor software 212, the authorization data 261, and the WSDL software 209 for the DQS. Further note, as described hereinabove, the WSDL software 209 is written in a WSDL format, although other formats are possible in other embodiments. The WSDL software 209 comprises an identifier of the DQS and all methods associated with the DQS, e.g., "getFullSet" as described hereinabove.

Figure 9:
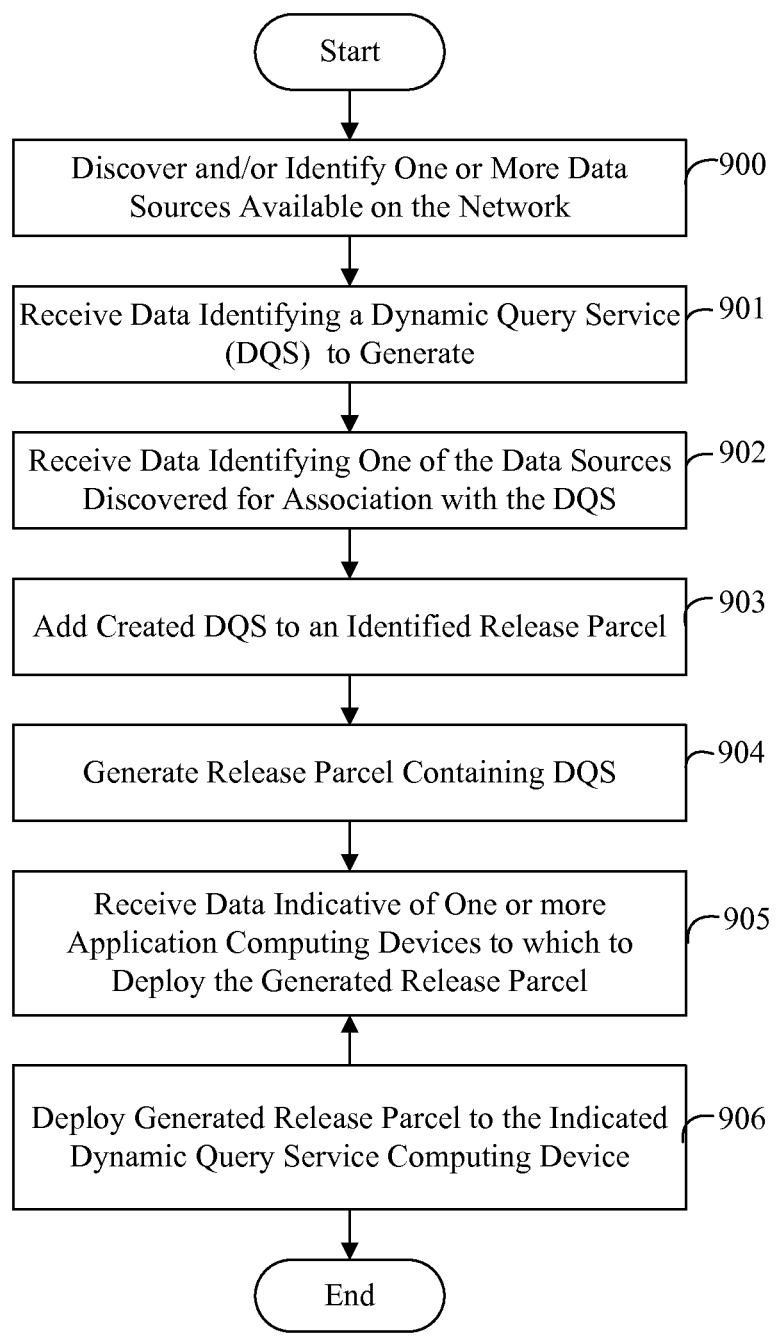
FIG. 9 is a flowchart depicting exemplary architecture and functionality of the application logic depicted in FIG. 2.

FIG. 9 is a flowchart depicting exemplary architecture and functionality of the application logic 106 (FIG. 2) in accordance with an embodiment of the present disclosure. In step 900, the application logic 106 discovers and/or identifies one or more data sources 104 (FIG. 1) and 108 (FIG. 1) available on the network 107 (FIG. 1), as indicated in step 900. Data identifying the data source 104 and 108 is stored as metadata 210 (FIG. 2).

As an example, a company may have a plurality of data sources 104 and 108 connected to the network 107. The databases may be, for example, an employee database that comprises employee names and corresponding identification information related to each of the employees. Another database may be a client database that comprises client names and corresponding identification information related to each of the clients. The employee database and the client database may be different types of databases that are accessed with differing protocols. The application logic 106 would contact both the employee database and the client database and store the connection information for each database.

The application logic 106 receives from a user (not shown) data identifying a DQS to generate in step 901. In this regard, the user may desire to generate a DQS that is associated with a particular data source 104 and 108. Thus, the application logic 106 further receives from the user data identifying one of the data sources 104 and 108 discovered in the discovery process in step 902. Such DQS, when generated, included in a release parcel, and deployed allows the user access to the data source 104 and 108 through the release parcel 109 (FIG. 1) by use of the Web services consuming software 130 (FIG. 1).

In the example provided, the user may desire to create a DQS for the employee database. In this regard, the user would identify the employee database with a DQS identifier.

In response to a user selection, the application logic 106 then adds the DQS to a release parcel 109 in step 903. In this regard, the metadata 210 simply associates the generated DQS with the release parcel 109.

In the example provided, the user may desire to add to a release parcel 109 the DQS associated with the employee database. The user would so indicate in the graphical user interfaces, and the application logic 106 would associate the DQSs with the selected release parcel in the metadata 210.

In response to a user selection, the application logic 106 then generates the release parcel 109 in step 904. In this regard, the application logic 106 generates the software that is included in the release parcel 109 that allows the user access to the selected data source 104 and 108 from the Web services consuming software 130. In one embodiment, the software generated includes the WSDL software 209 (FIG. 2), the wrapper software 207 (FIG. 2), the data source library data 211 (FIG. 2), the security interceptor software 212 (FIG. 2), and the authorization data 261 (FIG. 2).

In the example provided, the application logic 106 generates WSDL software 209 that defines a particular set of methods for the identified service. Such WSDL software 209 would define the method, including the inputs and outputs. In addition, the application logic 106 generates the data source library data 211 that contains the connection information for the employee database. Additionally, the application logic 106 generates the wrapper software 207 for translating an SQL statement into a JDBC call for the data source selected. Further, the application logic 106 generates security interceptor software 212 for authenticating and authorizing the operation and for executing the JDBC on the selected data source.

The application logic 106 then receives data indicative of one or more DQS computing devices 102 (FIG. 1) to which to deploy the generated release parcel 109 in step 905. Notably, the release parcel 109 can be deployed to a plurality of DQS computing devices 102. However, for simplicity only one DQS computing device 102 is shown in FIG. 1).

The application logic 106 then deploys the release parcel 109 to the identified DQS computing device 102 in step 906. In this regard, the application logic 106 transmits the release parcel 109 over the network 107 to the DQS computing device 102.

Figure 10:
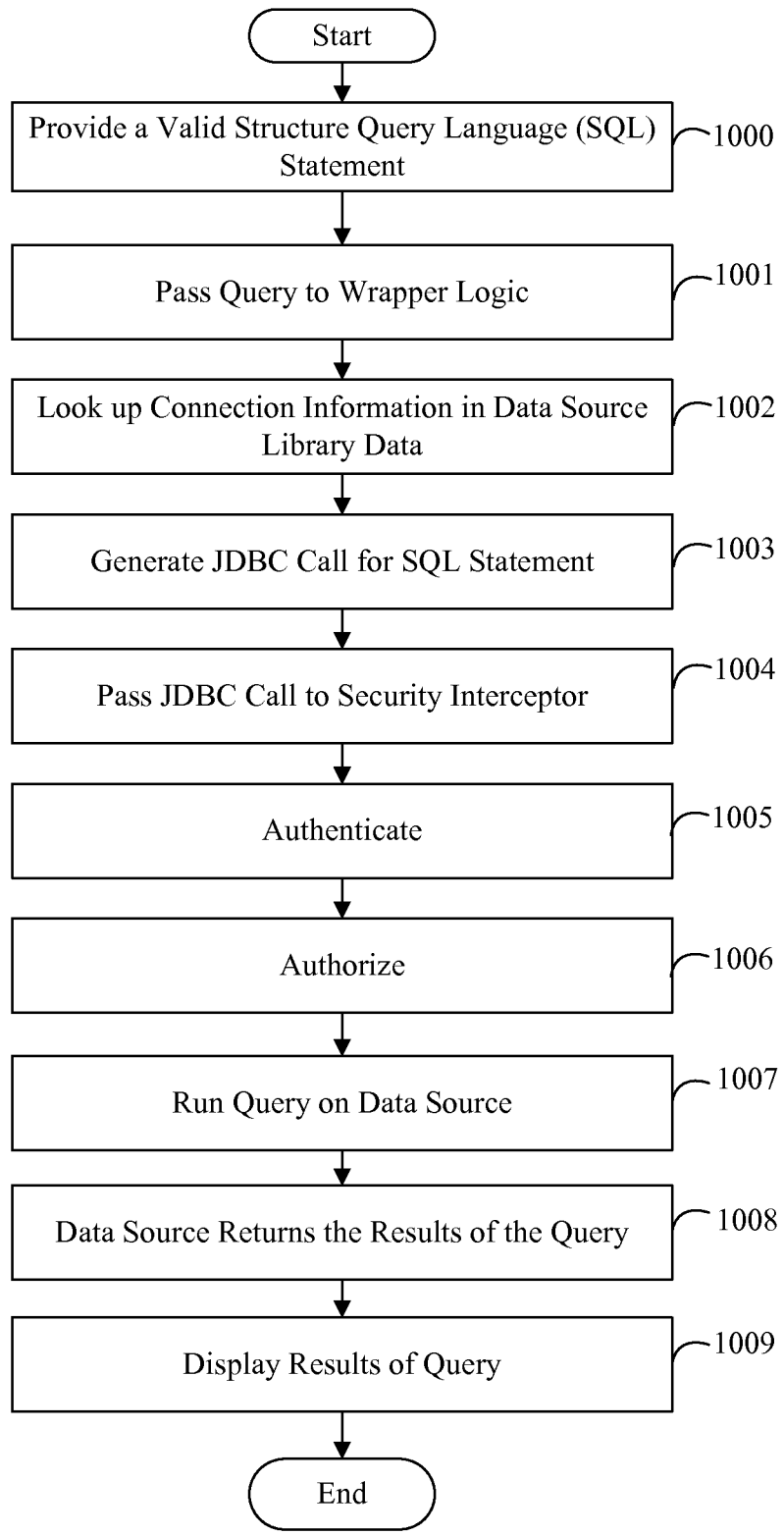
FIG. 10 is a flowchart depicting exemplary architecture and functionality of the release parcel depicted in FIG. 3.

FIG. 10 is a flowchart depicting exemplary architecture and functionality of the software contained in the release parcel 109. In this regard, a user (not shown) enters an SQL statement into the Web services consuming logic 130 (FIG. 1) in step 1000. Note that in one embodiment, the release parcel 109 is associated with only one of the data sources 104 (FIG. 1) and 108 (FIG. 1), and the SQL statement is run against the single data source 104 and 108. However, in another embodiment, the release parcel 109 is not specific to a single data source 104 and 108. Instead, the release parcel 109 is associated with all the data sources 104 and 108 found during the discovery process. In such a scenario, when the user enters the SQL statement, the user adds as a parameter into the Web services consuming software 130 an identifier identifying one of the plurality of data sources that may be contained in the data source library data 211 (FIG. 2). Additionally, the user may enter a username and password as parameters into the Web services consuming software 130 that accompanies the SQL statement.

Once the user enters the SQL statement into the Web services consuming software 130, the Web services consuming software 130 passes the SQL statement and any other arguments (e.g., a data source identifier) to the wrapper logic 207 (FIG. 2) in step 1001. The wrapper logic 207 then looks up the connection information for the SQL statement for the data source (either the single data source or the identified data source) in the data source library data 211 in step 1002.

The wrapper logic 207 then generates a JDBC call for the SQL statement in step 1003. In the JDBC call generated, the connection information obtained from the data source library data 211 is included in the JDBC call.

The wrapper logic 207 then passes the JDBC call, including the connection information, to the security interceptor software 212 in step 1004. As described hereinabove, the security interceptor logic 212 then authenticates the user in step 1005. In this regard, the security interceptor software 212 may transmit an authentication request to the security computing device 131, and the security computing device 131 response to the request indicates whether the username and password are validated and indicates a role associated with the username and password.

In step 1007, the security interceptor software 212 authorizes the operation on the data source 104 and 108 based upon the role submitted in the response from the security computing device 131. In this regard, the authorization data 261 comprises data that identifies the plurality of available roles, and corresponding to each role is a plurality of services and/or objects that the user is authorized to access on the data source 104 and 108. If the services and/or object contained in the SQL statement is authorized for the role, the security interceptor software 212 runs the query on the data source 104 and 108 in step 1007. In step 1008, the data source 104 and 108 on which the query is run returns the results of the query. In step 1009, the Web services consuming software 130 displays the results of the query to the user.

Now, therefore, the following is claimed:

1. A system comprising:
    a network;
    a data source communicatively coupled to the network;
    a processor operative with the network and with logic stored in memory of a first computing device, the logic configured to discover the data source through the network, retrieve information regarding services available from the data source receive and store metadata indicative of the discovered data source and the services available in the memory, the logic further configured to generate a release parcel comprising data and/or software for executing one or more selected services from the services available based on the metadata and selecting by a user one or more of the selected services from a list of the services available and deploy the release parcel to a second computing device wherein the one of more selected services is accessible by application logic executing on the second computing device.

2. The system of claim 1, wherein the metadata comprises data indicative of the connection information for the data source and execution information related to the available services.

3. The system of claim 2, wherein the logic is further configured to receive a first user input identifying a service to include in the release parcel and a second user input identifying the data source to associate with the identified service.

4. The system of claim 3, wherein the logic is further configured to associate the service with the release parcel in the metadata prior to generation.

5. The system of claim 4, wherein the logic is further configured to generate data source library data contained in the release parcel, the data source library data comprising connection information for connecting to the data source.

6. The system of claim 1, wherein the logic is further configured to generate web services description language software for executing operations for the services and/or objects associated with the data source in the metadata.

7. The system of claim 1, wherein the logic is further configured to generate wrapper software for translating a structured query language (SQL) statement into a Java database connectivity.

8. The system of claim 7, wherein the logic is further configured to generate security interceptor software 212 for receiving the JDBC call, authenticating a username and password in the JDBC call, and authorizing an operation contained in the JDBC call.

9. The system of claim 8, wherein the logic is further configured to generate authorization data containing one or more roles and authorized services and/or objects per each role.

10. A method comprising:
 discovering, by logic operative with a processor, at least one data source on a network and any available services of the data source;
 storing, by the logic operative with a processor, metadata obtained in the discovering step identifying the data source and available services;
 generating a release parcel comprising data and/or software for executing one or more selected services based on the metadata and based upon selection by a user of the one or more selected services from a list of the services available; and
 deploying the release parcel to a computing device via the network wherein one or more of the selected services is accessible by application logic executing on the computing device.

11. The method of claim 10, further comprising receiving a first user input identifying a selected service to be included in the release parcel.

12. The method of claim 11, further comprising receiving a second user input identifying a data source to associate with the selected services.

13. The method of claim 12, further comprising associating the selected service with the release parcel in the metadata prior to generation.

14. The method of claim 4, further comprising generating a data source library data contained in the release parcel, the data source library data comprising connection information for connecting to the data source.

15. The method of claim 14, further comprising web services description language (WSDL) software contained in the release parcel for executing operations for the services and/or objects associated with the data source in the metadata.

16. The method of claim 15, further comprising generating wrapper software contained in the release parcel for translating a structured query language (SQL) statement into a Java database connectivity (JDBC) call.

17. The method of claim 16, further comprising generating security interceptor software contained in the release parcel for receiving the JDBC call, authenticating a username and password in the JDBC call, and authorizing an operation contained in the JDBC call.

18. The method of claim 17, further comprising generating authorization data containing one or more roles and authorized services and/or objects per each role.

* * * * *